United States Patent
Sedivy

(10) Patent No.: US 10,648,209 B2
(45) Date of Patent: May 12, 2020

(54) HINGE ASSEMBLY WITH REINFORCED TORSION BAR

(71) Applicant: A RAYMOND ET CIE, Grenoble (FR)

(72) Inventor: Jiri Sedivy, Jablonec nad Nisou (CZ)

(73) Assignee: A RAYMOND ET CIE, Grenoble (FR)

( * ) Notice: Subject to any disclaimer, the term of this patent is extended or adjusted under 35 U.S.C. 154(b) by 0 days.

(21) Appl. No.: 16/315,419

(22) PCT Filed: May 4, 2017

(86) PCT No.: PCT/FR2017/051078
§ 371 (c)(1),
(2) Date: Jan. 4, 2019

(87) PCT Pub. No.: WO2018/007694
PCT Pub. Date: Jan. 11, 2018

(65) Prior Publication Data
US 2019/0309549 A1 Oct. 10, 2019

(30) Foreign Application Priority Data
Jul. 6, 2016 (FR) ..................................... 16 56470

(51) Int. Cl.
*E05D 1/00* (2006.01)
*E05F 1/08* (2006.01)
(Continued)

(52) U.S. Cl.
CPC .............. *E05D 1/02* (2013.01); *E05F 1/123* (2013.01); *H02G 3/0418* (2013.01); *H02G 3/14* (2013.01); *B60R 16/0239* (2013.01)

(58) Field of Classification Search
CPC ........... Y10T 16/53888; Y10T 16/5389; Y10T 16/5388; Y10T 16/54038; Y10T 16/53615;
(Continued)

(56) References Cited

U.S. PATENT DOCUMENTS 2,395,456 A * 2/1946 Bunker ................... E05F 1/123
16/308
2,576,996 A * 12/1951 Castedello ............. G03B 17/02
16/308
(Continued)

FOREIGN PATENT DOCUMENTS

FR 2982304 A1 5/2013

OTHER PUBLICATIONS

International Search Report Regarding PCT/FR2017/051078 dated Jul. 25, 2017.
(Continued)

*Primary Examiner* — Chuck Y Mah
(74) *Attorney, Agent, or Firm* — Dickinson Wright PLLC

(57) ABSTRACT

A one-piece hinge assembly (1) with a resilient torsion bar is provided. The one-piece hinge assembly (1) comprises a first hinge element (2A), a second hinge element (3A), and a torsion bar (6) that extends axially between the first hinge element (2A) and the second hinge element (3A). The second hinge element (3A) presents two load arms (8) that are constrained to pivot with the torsion bar. The first hinge element (2A) comprises a bearing body (9) that extends between the two load arms (8) and through which a middle portion of the torsion bar (6) passes.

8 Claims, 2 Drawing Sheets

(51) Int. Cl.
*E05D 1/02* (2006.01)
*E05F 1/12* (2006.01)
*H02G 3/04* (2006.01)
*H02G 3/14* (2006.01)
*B60R 16/023* (2006.01)

(58) Field of Classification Search
CPC ......... Y10T 16/53613; E05Y 2900/606; E05F
1/123; E05F 1/1238; E05D 11/08; E05D
11/082; E05D 11/084; E05D 1/02; G06F
1/1616; G06F 1/1681; H05K 5/0226;
H02G 3/0418; H02G 3/14; B60R 16/0239
See application file for complete search history.

(56) References Cited

U.S. PATENT DOCUMENTS

| | | | | |
|---|---|---|---|---|
| 2,732,581 | A * | 1/1956 | Heck | E05D 5/10 |
| | | | | 220/840 |
| 2,867,841 | A * | 1/1959 | Baldauf | E05F 1/123 |
| | | | | 16/308 |
| 3,091,819 | A * | 6/1963 | Wheeler | E05F 3/104 |
| | | | | 49/386 |
| 3,209,391 | A * | 10/1965 | Mangini | E05F 1/123 |
| | | | | 16/300 |
| 3,250,585 | A | 5/1966 | McQuarrie et al. | |
| 3,307,734 | A * | 3/1967 | Campbell | B65F 1/1623 |
| | | | | 220/827 |
| 3,787,923 | A * | 1/1974 | Peterson | E05F 1/12 |
| | | | | 16/308 |
| 4,349,120 | A * | 9/1982 | DiNardo | B65D 43/164 |
| | | | | 16/267 |
| 4,944,481 | A * | 7/1990 | Yurchenco | F16M 11/10 |
| | | | | 16/308 |
| 5,125,523 | A * | 6/1992 | Kulper | B65D 7/14 |
| | | | | 220/4.23 |
| 5,515,876 | A * | 5/1996 | Warner | A47L 15/4261 |
| | | | | 134/200 |
| 5,533,234 | A * | 7/1996 | Bizek | E05F 1/123 |
| | | | | 16/277 |
| 5,787,549 | A * | 8/1998 | Soderlund | E05F 1/123 |
| | | | | 16/308 |
| 5,828,005 | A | 10/1998 | Huynh-Ba et al. | |
| 6,461,026 | B1 * | 10/2002 | Wang | F21V 17/107 |
| | | | | 16/267 |
| 7,908,710 | B2 * | 3/2011 | Monneret | E02D 29/1463 |
| | | | | 16/260 |
| 7,959,846 | B2 * | 6/2011 | White | B29C 45/0017 |
| | | | | 16/221 |
| 2002/0002884 | A1 * | 1/2002 | Eromaki | G06F 1/1616 |
| | | | | 82/117 |
| 2002/0069483 | A1 * | 6/2002 | Savolainen | G06F 1/1616 |
| | | | | 16/308 |
| 2003/0025352 | A1 * | 2/2003 | Duffy | B60P 3/39 |
| | | | | 296/146.1 |
| 2005/0198777 | A1 * | 9/2005 | Mabe | E05D 5/10 |
| | | | | 16/308 |
| 2009/0139057 | A1 * | 6/2009 | Honda | B60J 5/103 |
| | | | | 16/343 |
| 2012/0006577 | A1 * | 1/2012 | Brantley | H02G 3/14 |
| | | | | 174/67 |
| 2015/0366113 | A1 | 12/2015 | Sreetharan | |
| 2018/0127162 | A1 * | 5/2018 | Murrill | B65D 1/16 |

OTHER PUBLICATIONS

Written Opinion Regarding PCT/FR2017/051078.
French Search Report Regarding French Application No. FR 1656470 dated Mar. 6, 2017.

* cited by examiner

HINGE ASSEMBLY WITH REINFORCED TORSION BAR

CROSS REFERENCE TO RELATED APPLICATIONS

The present application is a 371 national phase entry of PCT/FR2017/051078, filed on 4 May 2017, which claims the priority of FR Patent Application No. 1656470, filed on 6 Jul. 2016, the contents of which are incorporated herein by reference in their entirety.

TECHNICAL FIELD

The present invention relates to the field of casings having hinged covers designed in particular to form elements of a conduit for electric cables, for example in order to bring together bundles of cables at the engine block of a motor vehicle.

More particularly, the invention relates to a one-piece hinge assembly with a resilient torsion bar, the assembly comprising a first hinge element, a second hinge element, and a torsion bar that extends axially between the first hinge element and the second hinge element, the torsion bar having two ends that are connected to the first hinge element, and the second hinge element presenting two load arms that are spaced apart from each other in the axial direction and that are constrained to pivot with the torsion bar.

RELATED ART

In the motor vehicle industry, thermoplastic conduit elements are often placed under very difficult environmental conditions, i.e. they are subjected to heat, fuel, or grease, and are sometimes difficult to access.

Conduit elements generally include a casing with a hinged cover, and in addition to being in a damaging environment, the hinges are subjected to high levels of mechanical stress when being assembled or taken apart during motor vehicle maintenance processes.

Currently, conduit elements include a casing and a cover connected by a very thin hinge with a particular shape, which allows the cover to be folded onto the housing in a position in which the housing and the cover coincide.

Nevertheless, that thin hinge is not resistant to heat and other stress and it breaks in bending. One solution is for the manufacturer to use very specific plastics materials in order to manufacture those conduit elements, for example glass fiber reinforced plastics, in order to withstand the above-mentioned environments.

However, those plastics materials, which are often very rigid, do not make it possible to alleviate breaking during bending correctly.

Document FR 2 982 304 describes a casing with a cover and a torsion bar hinge that can be made of a rigid plastics material. However, in the event of the hinge breaking, it can be difficult to fold down and close the cover on the casing due to inaccuracy.

When the hinge is broken, the cover may also become completely separated from the casing and may therefore be lost.

Thus, with the casings having hinged covers that are used in the motor vehicle industry, in the event of a hinge breaking, the entire casing must be replaced, since it is usually no longer usable.

SUMMARY

The object of the invention is thus to provide another hinge assembly so as to mitigate the above-mentioned drawbacks.

To this end, the invention provides a one-piece hinge assembly with a resilient torsion bar, the assembly comprising a first hinge element, a second hinge element, and a torsion bar that extends axially between the first hinge element and the second hinge element, the torsion bar having two ends that are connected to the first hinge element, the second hinge element presenting two load arms that are spaced apart from each other in the axial direction and that are constrained to pivot with the torsion bar, the hinge assembly being characterized in that the first hinge element comprises a bearing body that extends between the load arms and through which a middle portion of the torsion bar passes.

The hinge assembly of the invention may present the following distinctive features:
- the bearing body may comprise two eyelet tabs that are spaced apart from each other axially between the two load arms, the middle portion of the torsion bar being free to turn in said two eyelet tabs;
- the two eyelet tabs may be connected to each other by a reinforcing strip;
- the bearing body may comprise a rolled-up loop of material forming a U-shape between the load arms in order to form a channel in which said middle portion of the torsion bar is free to turn;
- the torsion bar may present at its middle portion a cross-section that is larger than at its ends;
- the middle portion of said torsion bar presents an olive-shaped bulge; and
- the bearing body may be formed integrally with the torsion bar.

The invention extends to a casing with a hinged cover, characterized in that the casing and the cover are connected together by a hinge assembly of the invention.

The idea behind the invention is to obtain a casing with a hinged cover that is made in one piece, with a hinge integrated in the casing, the hinge presenting a torsion bar over which a bearing body surrounds the middle portion of the hinge in order to maintain a relative position in pivoting of the cover relative to the casing even when the torsion bar is broken, e.g. at one of its two ends.

The torsion bar is molded together with the bearing body in order to obtain a reinforced one-piece hinge element that is more resistant to multiple manipulations.

BRIEF DESCRIPTION OF THE DRAWINGS

The present invention can be better understood and other advantages appear on reading the following description and the accompanying drawings, in which.

DESCRIPTION OF EXAMPLE EMBODIMENTS

Figure 1:
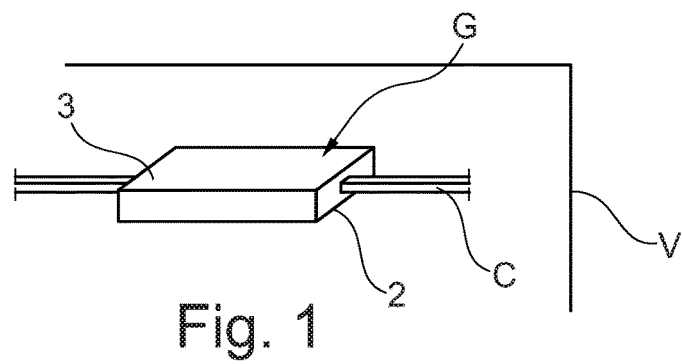
FIG. 1 is a diagram showing a part of a motor vehicle including a casing with a hinged cover of the invention that is used as a conduit for passing electrical cables.

FIG. 1 presents the inside of a portion of a motor vehicle V fitted with a conduit G element that in this example brings together a bundle of cables C.

Figure 2A:
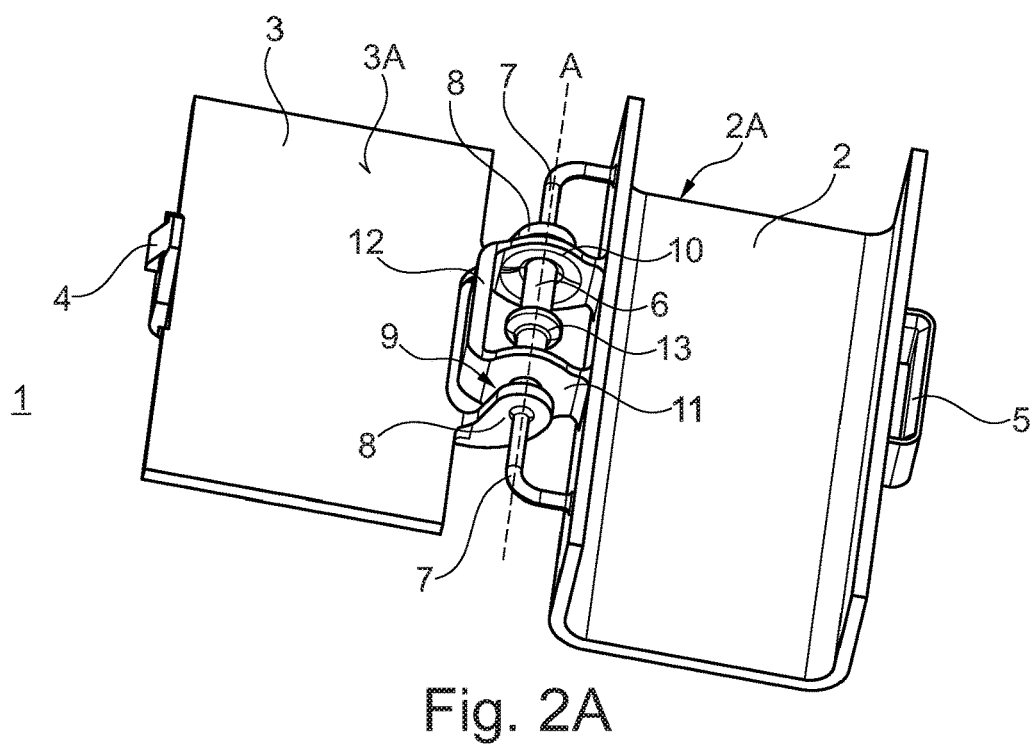
FIGS. 2A and 2B show in more detail a casing with a hinged cover in a first embodiment of the invention in which the hinge includes a bearing body formed by two eyelet tabs through which a torsion bar passes.
Figure 2B:
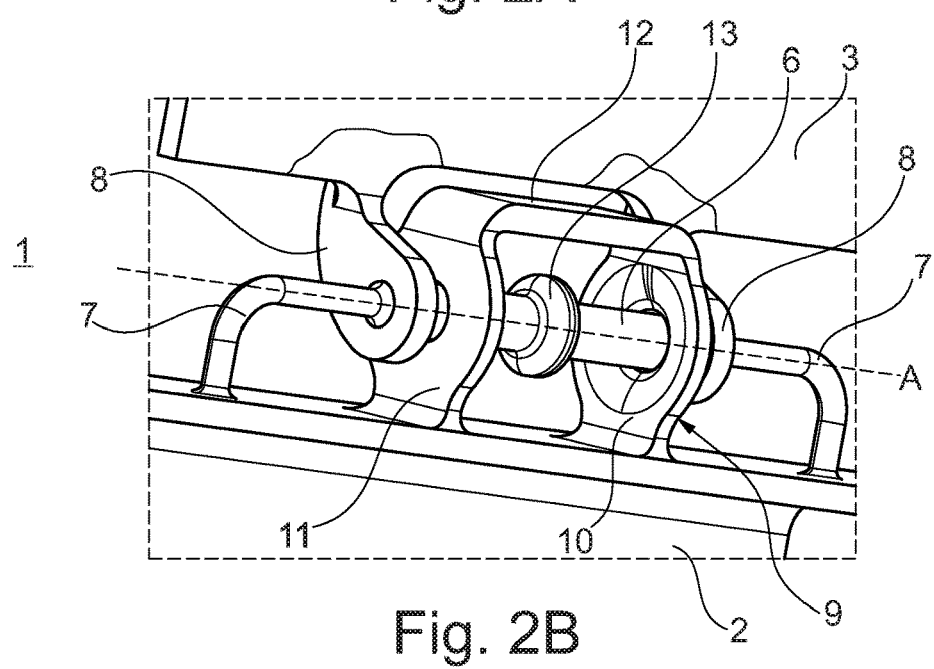
Figure 3A:
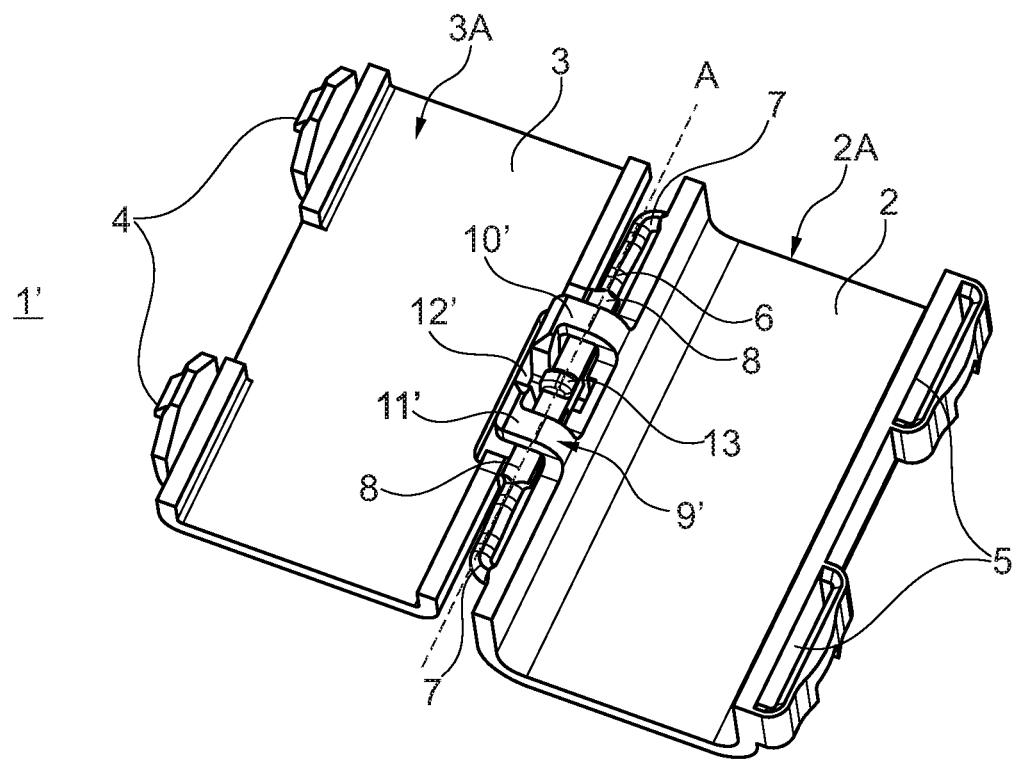
FIGS. 3A and 3B show in more detail a casing with a hinged cover in a second embodiment of the invention in which the hinge includes a U-shaped bearing body that is rolled up and through which a torsion bar passes.
Figure 3B:
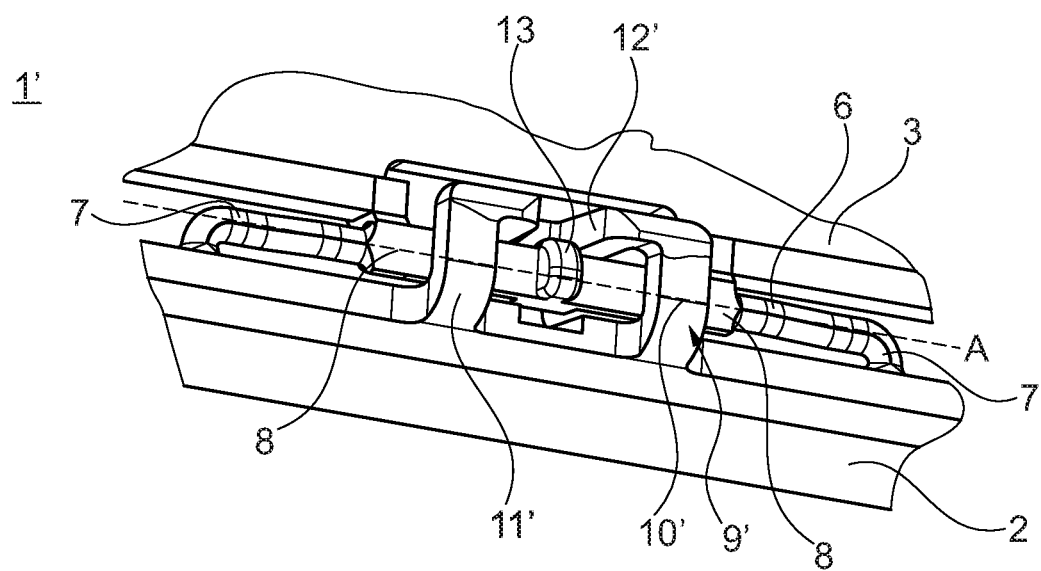

The conduit G element includes a casing 2 with a one-piece resilient hinged cover 3 that is not shown in the figure, this resilient hinge is suitable for being embodied as shown in FIGS. 2A, 2B in a first embodiment of the invention, or as shown in FIGS. 3A and 3B in a second embodiment of the invention.

In the description below, elements shared by both embodiments are given the same references.

In FIGS. 2A to 3B, the hinge assembly having reference 1 or 1' includes a first hinge element 2A shown forming part of the casing 2 and a second hinge element 3A shown forming part of the cover 3.

The cover 3 pivots on the casing 2, and a latch 4, shown present on the cover 3, is located to coincide with a lock 5 shown on the casing 2, in order to lock the cover 3 on the casing 2.

The hinge assembly 1, 1' of the invention includes a resilient torsion bar 6 that extends along an axis A between the first hinge element 2A and the second hinge element 3A.

As can be seen in the figures, the torsion bar 6 presents two ends specifically end bends 7 that are connected to the first hinge element 2A on the casing 2.

The second hinge element 3A on the cover 3 is shown presenting two load arms 8 that are spaced apart from each other in the axial direction A and that are constrained to pivot with the torsion bar 6.

In a first embodiment of the hinge element 1 of the invention as shown in FIGS. 2A and 2B, a bearing body 9 is provided between the two load arms 8, which bearing body 9 forms two eyelet tabs 10, 11 shown connected together by a reinforcing strip 12 made of plastics material forming a bridge between the two tabs 10, 11.

As can be seen in FIGS. 2A and 2B, the two eyelet tabs 10, 11 are spaced apart from each other axially between the two load arms 8 and they have passing therethrough the middle portion of the torsion bar 6, which is free to turn in the eyelets of the tabs 10, 11.

In addition, the two eyelet tabs 10, 11 are also quite close respectively to the two load arms 8 in such a manner as to avoid the bearing body 9 having axial clearance that is too great between the two load arms 8, for example if the torsion bar 6 is broken at one of its end bends 7.

As can be seen in FIGS. 2A, 2B, the torsion bar 6 presents a cross-section in its middle portion that is greater than the cross-section of the torsion bar 6 at its end bends 7, the change of cross-section occurring at the level of each load arm 8.

In addition, provision is made for the middle portion of the torsion bar 6 to present at its center an olive-shaped bulge 13 with an outside diameter that is greater than the inside diameter of the eyelets of the tabs 10, 11.

This olive-shaped bulge 13 prevents the torsion bar 6 from being released from the eyelet tabs 10, 11.

In the second embodiment, the hinge element 1' shown in FIGS. 3A and 3B comprises a bearing body 9' constituted by a U-shaped loop of material that is rolled up. More particularly, the two branches 10', 11' of the U-shape are folded back so that together, with the base 12' of the U-shape, they form a channel in which the torsion bar 6 extends axially.

The two branches 10' and 11' of the U-shape are arranged between the two load arms 8 with axial clearance that is not very large.

FIGS. 3A and 3B show the olive-shaped bulge 13, in the middle of the middle portion of the torsion bar 6, that presents a large cross-section.

In the invention, when the cover 3 is tilted over the casing 2 by a pivoting movement about the axis A, the load arms 8 stress the torsion bar 6 elastically in twisting, which bar twists at its end bends 7 but can turn freely in the bearing body 9, 9'.

Advantageously, if, under mechanical influence, the twisted torsion bar 6 breaks at one or the other of the end bends 7, the hinge assembly 1, 1' remains in one piece since the torsion bar 6 is held in the bearing body 9, 9'.

Thus, in the invention, even in the event of the torsion bar breaking 6, the latch 4 of the cover 3 can be caused to coincide correctly with the opening 5 of the casing 2.

The one-piece hinge assembly 1, 1' of the invention may be made of plastics material, e.g. by injection-molding or by 3D printing.

The invention claimed is:

1. A one-piece hinge assembly with a resilient torsion bar, comprising a first hinge element, a second hinge element, and a torsion bar that extends axially between said first hinge element and said second hinge element, said torsion bar having two ends connected to said first hinge element, and said second hinge element presenting two load arms that are spaced apart from each other in said axial direction and that are constrained to pivot with said torsion bar, said first hinge element comprises a bearing body that extends between said two load arms and through which a middle portion of said torsion bar passes.

2. A hinge assembly according to claim 1, wherein said bearing body comprises two eyelet tabs that are spaced apart from each other axially between said two load arms, said middle portion of said torsion bar being free to turn in said two eyelet tabs.

3. A hinge assembly according to claim 2, wherein said two eyelet tabs are connected to each other by a reinforcing strip.

4. A hinge assembly according to claim 1, wherein said bearing body comprises a rolled-up loop of material forming a U-shape between said two load arms in order to form a channel in which said middle portion of said torsion bar is free to turn.

5. A hinge assembly according to claim 1, wherein said middle portion of said torsion bar presents a cross-section that is larger than at its ends.

6. A hinge assembly according to claim 1, wherein said middle portion of said torsion bar presents an olive-shaped bulge.

7. A hinge assembly according to claim 1, wherein said bearing body is formed integrally with said torsion bar.

8. A casing with a hinged cover, wherein said casing and said cover are connected together by a hinge assembly according to claim 1.

* * * * *